United States Patent
Bringoltz et al.

(10) Patent No.: US 12,547,082 B2
(45) Date of Patent: Feb. 10, 2026

(54) COMBINING PHYSICAL MODELING AND MACHINE LEARNING

(71) Applicant: NOVA LTD., Rehovot (IL)

(72) Inventors: Barak Bringoltz, Rehovot (IL); Ran Yacoby, Rehovot (IL); Ofer Shlagman, Rehovot (IL); Boaz Sturlesi, Rehovot (IL)

(73) Assignee: Nova Ltd., Rehovot (IL)

( * ) Notice: Subject to any disclaimer, the term of this patent is extended or adjusted under 35 U.S.C. 154(b) by 753 days.

(21) Appl. No.: 17/758,398

(22) PCT Filed: Dec. 31, 2020

(86) PCT No.: PCT/IL2020/051365
§ 371 (c)(1),
(2) Date: Jul. 5, 2022

(87) PCT Pub. No.: WO2021/140502
PCT Pub. Date: Jul. 15, 2021

(65) Prior Publication Data
US 2023/0023634 A1   Jan. 26, 2023

Related U.S. Application Data

(60) Provisional application No. 62/957,338, filed on Jan. 6, 2020.

(51) Int. Cl.
G03F 7/00 (2006.01)
G06F 30/27 (2020.01)
G06F 30/398 (2020.01)

(52) U.S. Cl.
CPC .......... *G03F 7/705* (2013.01); *G03F 7/70508* (2013.01); *G03F 7/706841* (2023.05); *G06F 30/27* (2020.01); *G06F 30/398* (2020.01)

(58) Field of Classification Search
None
See application file for complete search history.

(56) References Cited

U.S. PATENT DOCUMENTS 7,395,132 B2 * 7/2008 Prager .................... G01B 11/24
                                                              700/108
8,139,843 B2 * 3/2012 Kulkarni ........... H01L 21/67005
                                                              382/145

(Continued)

FOREIGN PATENT DOCUMENTS

KR    20090011593 U    11/2009
KR    20180125056 A    11/2018

(Continued)

OTHER PUBLICATIONS

Y. Lin et al., "Data Efficient Lithography Modeling With Transfer Learning and Active Data Selection," IEEE. Trans. on Computer-Aided Design of Integrated Circuits and Systems, vol. 38, No. 10, Oct. 2019, pp. 1900-1913. (Year: 2019).*

*Primary Examiner* — Leigh M Garbowski
(74) *Attorney, Agent, or Firm* — Reches Patents

(57) ABSTRACT

A system and methods for OCD metrology are provided including receiving reference parameters, receiving multiple sets of measured scatterometric data, and receiving an optical model designed to generate one or more sets of model scatterometric data according to a set of pattern parameters, and training a machine learning model by applying, during the training, target features including the reference parameters, and by applying input features including the sets of measured scatterometric data and the sets of model scatterometric data, such that the trained machine learning model estimates new wafer pattern parameters from subsequently sets of measured scatterometric data.

14 Claims, 7 Drawing Sheets

(56) References Cited

U.S. PATENT DOCUMENTS

| | | | | |
|---|---|---|---|---|
| 9,401,014 | B2* | 7/2016 | Zafar | G06F 30/398 |
| 9,435,735 | B1* | 9/2016 | Dziura | G03F 7/705 |
| 11,520,321 | B2* | 12/2022 | Pandev | G06F 30/367 |
| 11,580,375 | B2* | 2/2023 | Bhaskar | G06N 3/08 |
| 12,093,632 | B2* | 9/2024 | Van Den Brink | G06F 30/398 |
| 12,265,377 | B2* | 4/2025 | Panda | H01L 21/67276 |
| 2019/0049602 | A1* | 2/2019 | Hench | G01N 23/201 |
| 2019/0259145 | A1 | 8/2019 | Kong et al. | |
| 2020/0005140 | A1 | 1/2020 | Cherian et al. | |
| 2020/0200525 | A1* | 6/2020 | Chouaib | G01B 11/0641 |
| 2020/0335406 | A1* | 10/2020 | Liman | H01L 22/12 |
| 2021/0018850 | A1* | 1/2021 | Slachter | G03F 7/70558 |
| 2022/0171290 | A1* | 6/2022 | Onose | G03F 7/70625 |

FOREIGN PATENT DOCUMENTS

| | | | |
|---|---|---|---|
| WO | 2019200015 | A1 | 10/2019 |
| WO | 2019239380 | A1 | 12/2019 |

* cited by examiner

COMBINING PHYSICAL MODELING AND MACHINE LEARNING

FIELD OF THE INVENTION

The present invention relates generally to the field of optical inspection of integrated circuit wafer patterns, and in particular to algorithms for measurement of wafer pattern parameters.

BACKGROUND

Integrated circuits (ICs) are produced on semiconductor wafers through multiple steps of depositing, altering, and removing thin layers that build up into stacked structures on the wafers. These stacked structures, or "stacks," are typically formed in repetitive patterns that, like diffraction gratings, have optical properties. Modern metrology methods for measuring critical dimensions (CDs) and material properties of these patterns exploit these optical properties. Hereinbelow, CDs and material properties are also referred to as "pattern parameters," or simply as "parameters." These parameters may include the height, width, and pitch of stacks. As described by Dixit, et al., in "Sensitivity analysis and line edge roughness determination of 28-nm pitch silicon fins using Mueller matrix spectroscopic ellipsometry-based optical critical dimension metrology," J. Micro/Nanolith. MEMS MOEMS. 14(3), 031208 (2015), incorporated herein by reference, pattern parameters may also include: side wall angle (SWA), spacer widths, spacer pull-down, epitaxial proximity, footing/undercut, over-fill/under-fill of 2-dimentional (HKMG), 3-dimentional profile (Fin-FETs) and line edge roughness (LER).

Optical critical dimension (OCD) metrology employs methods of scatterometry to measure scatterometric data, that is, reflected light radiation that is indicative of optical properties of patterns. A measurement set of scatterometric data (which may also be referred to as a scatterometric signature) may include data points of reflected zeroth-order irradiance versus an incident angle of radiation. Alternatively, or additionally, scatterometric data may include spectrograms that are measures of reflected radiation intensity over a range of wavelengths or frequencies. Additional types of scatterometric data known in the art may also be applied in OCD metrology.

U.S. Pat. No. 6,476,920 to Scheiner and Machavariani, "Method and apparatus for measurements of patterned structures," incorporated herein by reference, describes development of an "optical model" (also referred to as "physical model"). An optical model is a function (i.e., a set of algorithms) defining a relation between reflected radiation and the physical structure of a wafer. That is, optical models are theoretical models of how light is reflected from patterns with known parameters. Such optical models can therefore be applied to generate, from a set of known pattern parameters, an estimate of scatterometry data that would be measured during spectrographic testing. Optical models can also be designed to perform the converse (or "inverse") function, of estimating pattern parameters based on measured scatterometry data.

Optical models are commonly applied for OCD metrology during IC production to measure, based on scatterometric measurements, whether wafer patterns are being fabricated with correct parameters. Each pattern of a given wafer may be measured to determine how much the parameters of each patterns varies from a design specification or from a mean value.

As an alternative to optical modeling, machine learning (ML) techniques may be applied to estimate pattern parameters based on scatterometry data. For example, as described in PCT patent application WO 2019/239380 to Rothstein, et al., incorporated herein by reference, a machine learning model may be trained to identify correspondences between measured scatterometry data and reference parameters measured by methods described below. After an ML model is trained to estimate parameters from scatterometry data, it may then be applied to make such parameter estimates during IC production.

Exemplary scatterometric tools for measuring (acquiring) scatterometry data (e.g., spectrograms) may include spectral ellipsometers (SE), spectral reflectometers (SR), polarized spectral reflectometers, as well as other optical critical dimension (OCD) metrology tools. Such tools are incorporated into OCD metrology systems currently available. One such OCD metrology system is the NOVA T600® Advanced OCD Metrology tool, commercially available from Nova Measuring Instruments Ltd. of Rehovot, Israel, which takes measurements of pattern parameters that may be at designated test sites or "in-die." Additional methods for measuring critical dimensions (CDs) include interferometry, X-ray Raman spectrometry (XRS), X-ray diffraction (XRD), and pump-probe tools, among others. Some examples of such tools are disclosed in patents WO2018/211505, U.S. Pat. Nos. 10,161,885, 10,054,423, 9,184,102, and 10,119,925, all assigned to the Applicant and incorporated herein by reference in their entirety.

High accuracy methods of measuring pattern parameters that do not rely on the optical models described above include wafer measurements with equipment such as CD scanning electron microscopes (CD-SEMs), atomic force microscopes (AFMs), cross-section tunneling electron microscopes (TEMs), or X-ray metrology tools. These methods are typically more expensive and time-consuming than optical and ML modeling methods.

However, optical and ML modeling also have shortcomings. Because geometric models used for optical modeling are idealizations of actual pattern parameters, and because of the difficulties in solving non-linear scattering equations numerically, optical modeling is also time consuming and is also prone to errors, especially as the dimensions of pattern parameters continue to shrink. On the other hand, due to its physics-based foundations, optical modeling is generally reliable. Moreover, the direct association between physical parameters and theoretical optical properties means that optical model results are typically more easily interpretable than ML results. ML modeling, on the other hand, while avoiding some of the time-consuming hurdles of optical modeling, typically requires large data sets of reference parameters and scatterometry data for training, and the acquisition of these parameters also requires expensive, time consuming metrology equipment. Embodiments of the present invention as disclosed hereinbelow help to overcome the shortcomings of both these methods.

SUMMARY

Embodiments of the present invention provide a system and methods for generating machine learning models for OCD that exploit both measured scatterometric data and known optical models, the optical models having been designed according to physical laws. Methods are provided that include: receiving multiple sets of reference parameters from multiple respective wafer patterns and receiving multiple corresponding sets of measured scatterometric data, measured from the multiple respective wafer patterns; receiving an optical model designed to calculate sets of model scatterometric data from pattern parameters provided to the optical model; training a machine learning model by applying, during the training, target features including the reference parameters, and by applying input features including the sets of measured scatterometric data and the sets of model scatterometric data, such that the trained machine learning model estimates new wafer pattern parameters from subsequently measured sets of scatterometric data.

In some embodiments, the optical model (OM) may be further designed to perform an inverse function of calculating model pattern parameters from a set of scatterometric data, and the training of the ML model may include: calculating multiple sets of model pattern parameters by applying the optical model to calculate for each set of measured scatterometric data a set of corresponding model pattern parameters; calculating multiple sets of model scatterometric data by applying the optical model to each set of corresponding model pattern parameters, to generate a corresponding set of model scatterometric data; generating combined feature vectors by combining, for each of the multiple sets of measured scatterometric data, the set of measured scatterometric data, the corresponding model pattern parameters, and the corresponding set of model scatterometric data into a combined feature vector; and training the ML model, with the reference parameters as the target features of the training, and the combined feature vectors as the input features.

In further embodiments, the ML model may be a transfer neural network (NN), and the training of the ML model may include training a first NN and the transfer NN, such that training the first NN and the transfer NN includes: generating multiple sets of simulated pattern parameters; generating multiple sets of model scatterometric data by applying the optical model to generate a set of model scatterometric data for each set of simulated pattern parameters; training the first NN with a first target set including the multiple sets of simulated pattern parameters and with first input features including the sets of model scatterometric data; and training the transfer NN with initial layers transferred from the first NN, to train one or more final layers of the transfer NN. The multiple sets of reference parameters are set as the target features, with the multiple sets of measured scatterometric data as the corresponding input features.

In further embodiments, training the ML model may include minimizing a loss function with respect to the reference set of pattern parameters, and wherein the loss function is a mean squared error (MSE) function. The set of reference parameters may be measured with high accuracy metrology by one or more of a CD scanning electron microscope (CD-SEM), an atomic force microscope (AFM), a cross-section tunneling electron microscope (TEM), or an X-ray metrology tool, or by high accuracy OCD spectroscopy relying on optical modeling. The multiple respective wafer patterns may be located on one or more wafers. In some embodiments, the multiple sets of measured scatterometric data may be measured by two or more measurement channels.

There is further provided, by embodiments of the present invention, a system for OCD metrology comprising a processor having non-transient memory, the memory including instructions that when executed by the processor cause the processor to implement steps of: receiving multiple sets of reference parameters from multiple respective wafer patterns and receiving multiple corresponding sets of measured scatterometric data, measured from the multiple respective wafer patterns; receiving an optical model designed to calculate model scatterometric data from pattern parameters provided to the model; training a machine learning model by applying, during the training, target features including the reference parameters, and input features including the sets of measured scatterometric data and the model scatterometric data, such that the trained machine learning model estimates new wafer pattern parameters from subsequently sets of measured scatterometric data.

BRIEF DESCRIPTION OF DRAWINGS

For a better understanding of various embodiments of the invention and to show how the same may be carried into effect, reference is made, by way of example, to the accompanying drawings. Structural details of the invention are shown to provide a fundamental understanding of the invention, the description, taken with the drawings, making apparent to those skilled in the art how the several forms of the invention may be embodied in practice. In the figures.

DETAILED DESCRIPTION

Embodiments of the present invention provide systems and methods for generating machine learning (ML) models for optical critical dimension (OCD) monitoring by exploiting known optical OCD models (referred to herein as "optical models"). By training ML models with at least some scatterometry data that are generated by optical models (i.e., with "model" scatterometry data), rather than training only with actual measurements, results may be improved and costs reduced.

Figure 1:
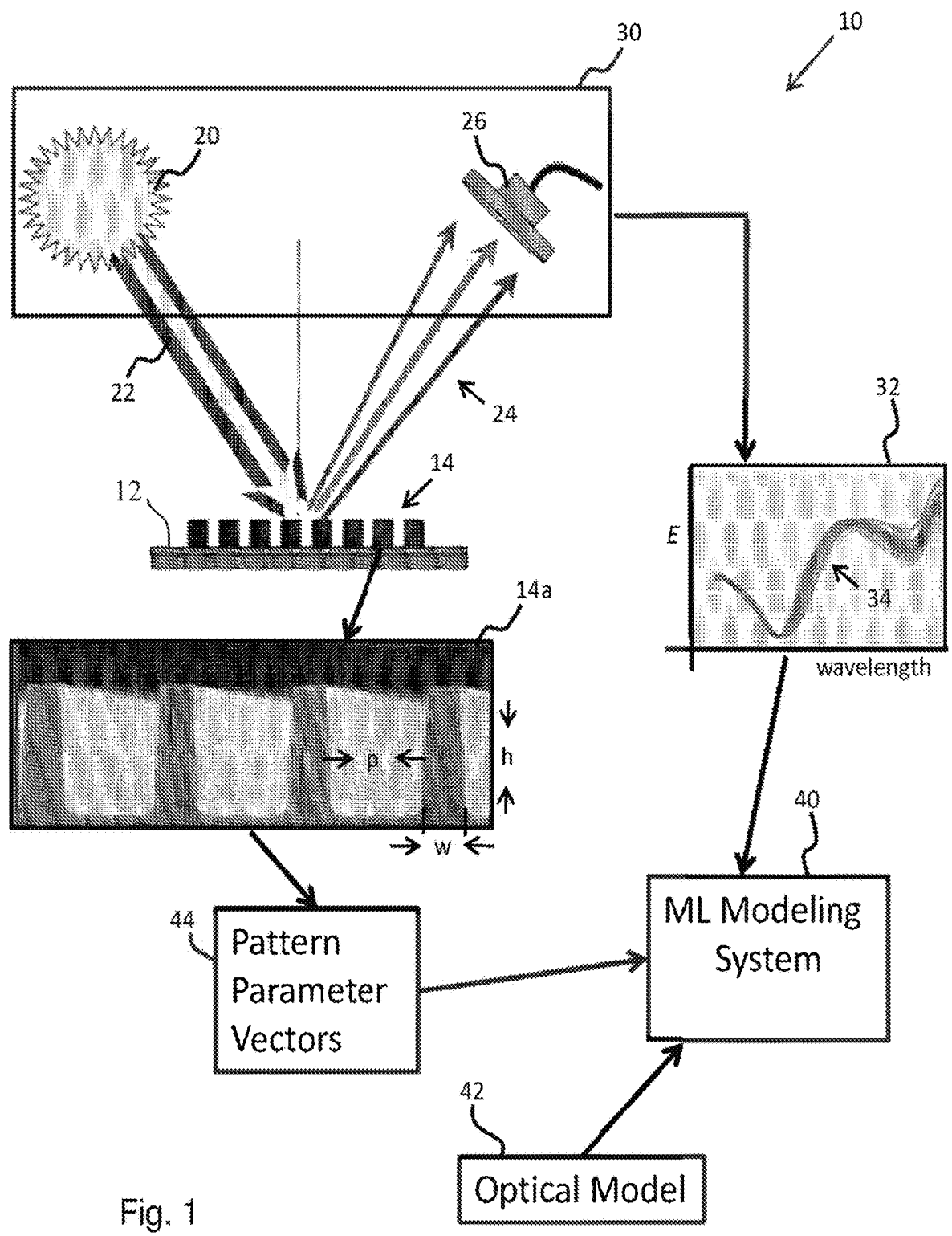
FIG. 1 is a schematic diagram of a system for generating a machine learning model for OCD metrology, exploiting both spectrograph data and an optical OCD model, in accordance with an embodiment of the present invention.

FIG. 1 is a schematic diagram of a system 10 for generating a machine learning model for OCD metrology, exploiting both spectrograph data and an optical model, in accordance with an embodiment of the present invention.

The system 10 may operate within a production line (not shown) for production and monitoring of wafers 12. As indicated, wafers 12 include patterns 14. These patterns have parameters, such as height ("h"), width ("w"), and pitch ("p"), as indicated in the pattern enlargement 14a, as well as other parameters described in the Background above. Typically, wafers have multiple regions, or segments, that are designed to have the same patterns (i.e., the same pattern design is used to manufacture all of the patterns). For each pattern, multiple parameters may be measured. Hereinbelow, a set of multiple parameters from a given pattern is also referred to as a pattern vector.

Manufacturing variations cause slight variations in the parameters of patterns between wafers and across a single wafer, variations that are indicated by variations in measured scatterometry data.

The system 10 includes a light source 20, which generates a beam of light 22 of a predetermined wavelength range. The beam of light 22 is reflected from the wafer patterns 14 (indicated as reflected, or "scattered," light 24) towards a spectrophotometric detector 26. In some configurations, the light source and spectrophotometric detector are included in an OCD metrology system 30 (e.g., ellipsometer or a spectrophotometer). The construction and operation of the metrology system 30 may be of any known kind, for example, such as disclosed in U.S. Pat. No. 5,517,312, "Device for measuring the thickness of thin films," to Finarov, incorporated herein by reference. Typically the metrology system 30 includes additional components, not shown, such as light directing optics, which may include a beam deflector having an objective lens, a beam splitter and a mirror. Additional components of such systems may include imaging lenses, polarizing lenses, variable aperture stops, and motors. Operation of such elements is typically automated by computer controllers, which may include I/O devices and which may also be configured to perform data processing tasks, such as generating scatterometry data 32.

The scatterometry data 32 generated by the metrology system 30 typically includes various types of plotted data 34, which may be represented in vector form (e.g., a spectrogram whose data points are measures of reflected light intensity at different light wavelengths). As described above, variations between sets of measured scatterometric data are indicative of differing pattern parameters. In typical OCD metrology, the range of light that is measured may cover the visible light spectrum and may also include wavelengths in ultraviolet and infrared regions. A typical spectrogram output for OCD metrology may have 245 data points covering a wavelength range of 200 to 970 nm.

In embodiments of the present invention, a computer system including ML tools known in the art, referred to herein as an ML modeling system 40, may be configured for training an ML model for OCD metrology. Input training feature vectors used by the ML modeling system may include both sets of measured scatterometric data 34 as well as scatterometric data generated by an optical model 42, i.e., "model scatterometric data." Reference parameters 44 (indicated as "pattern parameter vectors") may be used as target feature sets for ML training. The reference parameters may be acquired from patterns of one or more wafers by high accuracy means known in the art, such as described above (e.g., CD-SEM, AFM, TEM, X-ray metrology, or high accuracy OCD spectroscopy relying on optical modeling). After training, the ML model is used to predict pattern parameters based on measured scatterometric data, a process that may be applied, for example, in the monitoring of wafer production.

The ML modeling system 40 may operate independently of the metrology system 30 or may be integrated with the metrology system.

Hereinbelow, processes are described for ML training that exploit use of training feature vectors based on both measured scatterometric data and model scatterometric data. By incorporating the knowledge both of measured data and of optical methods, ML models can be made more accurate despite reliance on relatively small training data sets. In particular, two examples of such ML training are described, process 200, described with respect to FIGS. 2 and 3, and process 400 described with respect to FIGS. 4 and 5. Hereinbelow, process 200 is also referred to as a combined feature vector method, and process 400 is also referred to as a transfer learning neural network method.

The descriptions of processes 200 and 400 make use of the following nomenclature. Scatterometric data measured by OCD metrology from a single pattern is referred to as a set (i.e., a "single" set) of scatterometric data and may be represented as a measured scatterometric vector $\vec{S}^{(measured)}$. A set of theoretical scatterometric data calculated by an optical model from a set of pattern parameters (i.e., a "set of model scatterometric data") may be represented as a scatterometric vector $\vec{S}^{(model)}$. A set of reference parameters, i.e., parameters that are measured directly from a wafer without an optical model, may be represented as a reference parameter vector, $\vec{p}^{(reference)}$, while parameters that are generated from a set of scatterometric data according to an optical model may be represented as a model parameter vector, $\vec{p}^{(model)}$.

An optical model may itself be represented as a function that either predicts (or "generates") a scatterometric vector $\vec{S}^{(model)}$ from a set of parameters, $\vec{p}$ (which may be measured parameters, or which may themselves be modeled parameters), or performs the converse function, predicting $\vec{p}^{(model)}$ from a set of scatterometric data $\vec{S}$ (which may either be measured or generated by an optical model). The converse function of an optical model may also be written as a "pseudo-inverse" version of the function, i.e., the function may be written as $f_{OM}$ and the pseudo-inverse as $f_{OM}^{-1}$. Mathematically, the above definitions may therefore be written as:

$$\vec{S}^{(model)} \equiv f_{OM}(\vec{p}), \text{ and}$$

$$\vec{p}^{(model)} \equiv f_{OM}^{-1}(\vec{S}).$$

Figure 2:
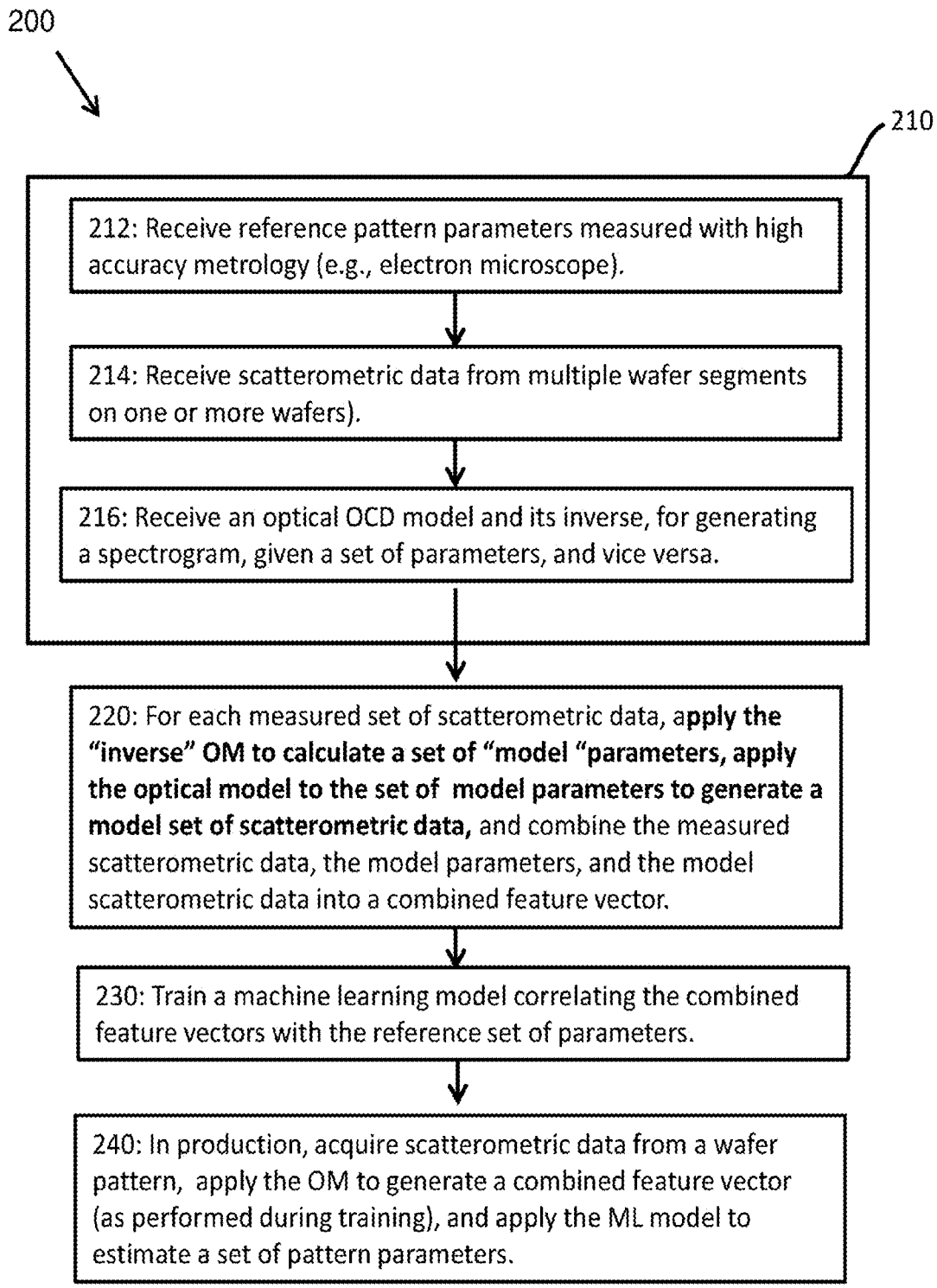
FIG. 2 is a flow diagram depicting a process for generating a first machine learning model for OCD metrology, exploiting both spectrograph data and an optical OCD model, in accordance with an embodiment of the present invention.

FIG. 2 is a flow diagram depicting computer-implemented process 200 for generating a machine learning model for OCD metrology, exploiting both scatterometric data and an optical model, in accordance with an embodiment of the present invention. Process 200 may be implemented by the ML modeling system 40, described above.

Process 200 begins with a set of steps 210, at which the modeling system is provided with external data and algorithms. A first step 212 includes receiving multiple sets of reference parameters, i.e., multiple parameter vectors: $\{\vec{p}_1^{(reference)}, \vec{p}_2^{(reference)}, \ldots, \vec{p}_n^{(reference)}\}$.
These parameter vectors are measured from respective reference patterns. Each set of reference parameters includes one or more data points (e.g., height, width, pitch, etc.). Each set is subsequently correlated with a set of scatterometric data during ML training, as described below. Reference wafer patterns are typically a portion of a full wafer, a portion that is repeated over the surface of the wafer. The reference parameters may be measured with high accuracy OCD metrology. As described above, high accuracy OCD metrology may include CD-SEM, AFM, TEM, X-ray metrology, or high accuracy OCD spectroscopy relying on optical modeling. The number of sets of reference parameters measured defines the size of the training data set as described below.

A step 214 includes receiving multiple sets of measured scatterometric data: $\{\vec{S}_1^{(measured)}, \vec{S}_2^{(measured)}, \ldots, \vec{S}_n^{(measured)}\}$.

Each set of scatterometric data is measured from a respective wafer pattern from which a corresponding parameter vector (i.e., a corresponding "set of parameters") is also measured.

In addition to the sets of measured scatterometric data and the reference parameters, an optical OCD model and its inverse function (i.e., $f_{OM}$ and $f_{OM}^{-1}$) are received, at a step 216. As described above, the optical OCD model is generated from the application of physical laws of optics. It is to be understood that the set of steps 210 may be performed in any order or in parallel, and in particular the measured scatterometric data may be acquired before the pattern parameters (this option being a requirement when a destructive metrology tool is used to obtain the pattern parameters).

Next, at a step 220, for each set of measured scatterometric data $\vec{S}_k^{(measured)}$, the optical model, $f_{OM}^{-1}$ is applied to calculate a set of model pattern parameters $\vec{p}_k^{(model)}$. That is $\vec{p}_k^{(model)} = f_{OM}^{-1}(\vec{S}_k^{(measured)})$.

The optical model $f_{OM}$ is then applied to each set of generated model pattern parameters $\vec{p}_k^{(model)}$ to generate a corresponding set of model scatterometric data, i.e., a model scatterometric vector $\vec{S}_k^{(model)}$. That is $\vec{S}_k^{(model)} = f_{OM}(\vec{p}_k^{(model)})$.

Each set of measured scatterometric data $\vec{S}^{(measured)}$ (removing the index k for generalization to all sets of measured scatterometric data) is then combined with its corresponding model set of parameters $\vec{p}^{(model)}$ and its corresponding set of model scatterometric data $\vec{S}^{(model)}$, into a single combined vector, referred to herein as $\vec{C}$, i.e., $\vec{C} \equiv (\vec{S}^{(measured)}, \vec{S}^{(model)}, \vec{p}^{(model)})$.

In an exemplary scenario, the vectors $\vec{S}^{(measured)}$ and $\vec{S}^{(model)}$ both include 245 data points. The vector $\vec{p}^{(model)}$ typically has between 1 and 10 data points. An exemplary vector $\vec{C}$ may therefore include 245+245+10=500 data points.

At a step 230, a machine learning model is trained correlating each of the combined feature vectors $\vec{C}$ with its corresponding reference set of pattern parameters $\vec{p}^{(reference)}$. (Input and output features for training are matched based on the same wafer pattern having been used to measure the output features $\vec{p}^{(reference)}$ and to measure the measured scatterometric vector $\vec{S}^{(measured)}$ of the input feature combined vector $\vec{C}$.)

Figure 3:
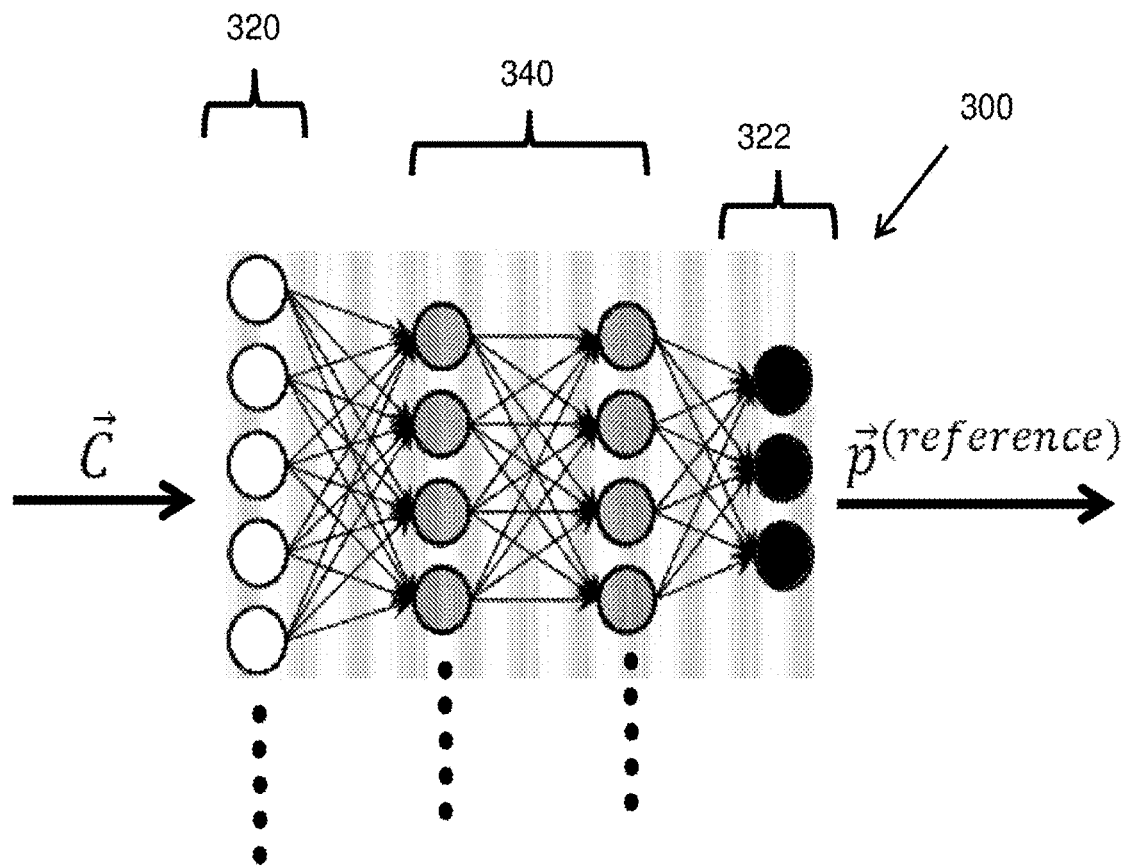
FIG. 3 is a schematic diagrams of a neural network implementing the first machine learning model, in accordance with an embodiment of the present invention.

FIG. 3 shows a schematic example of the ML model as a neural network (NN) 300, indicating the input feature vectors as an exemplary vector $\vec{C}$, and the output feature vectors as $\vec{p}^{(reference)}$. Input nodes of the ML model are indicated as nodes 320 and output nodes are indicated as nodes 322. The number of input nodes is typically tuned to the size of the input vector, meaning there would be 500 input nodes for the example described above (which may be rounded to a power of 2, i.e., 512 nodes, by extrapolating additional data points in each $\vec{S}^{(measured)}$). The number of output nodes would correspond to the number of parameters in each set of pattern parameters. As indicated by the NN 300, the neural network may be designed to be fully connected. Depending on the number of sets of measured scatterometric data (i.e., the size of the training data set), hidden layers 340 may be added to the NN 300. (For a limited number of sets of measured scatterometric data, hidden layers may not improve accuracy.) Training is typically performed according to standard ML training methods, which may include, for example, L2 regularization. The correlation between the input and output feature vectors may be defined by a mean squared error (MSE) loss function. Preferably, a validation data set of combined feature vectors would be generated from sets of measured scatterometric data acquired from different wafers than those used in the training data set.

Referring back to FIG. 2, after the ML model is trained, it may be applied during IC wafer production to monitor pattern parameters (step 240). In the production stage, scatterometric data are measured from wafer patterns. Combined feature vectors are then generated from the sets of measured scatterometric data, as described above. The combined feature vectors are then applied to the trained ML model to predict (i.e., estimate) the parameters of the wafer patterns.

Figure 4:
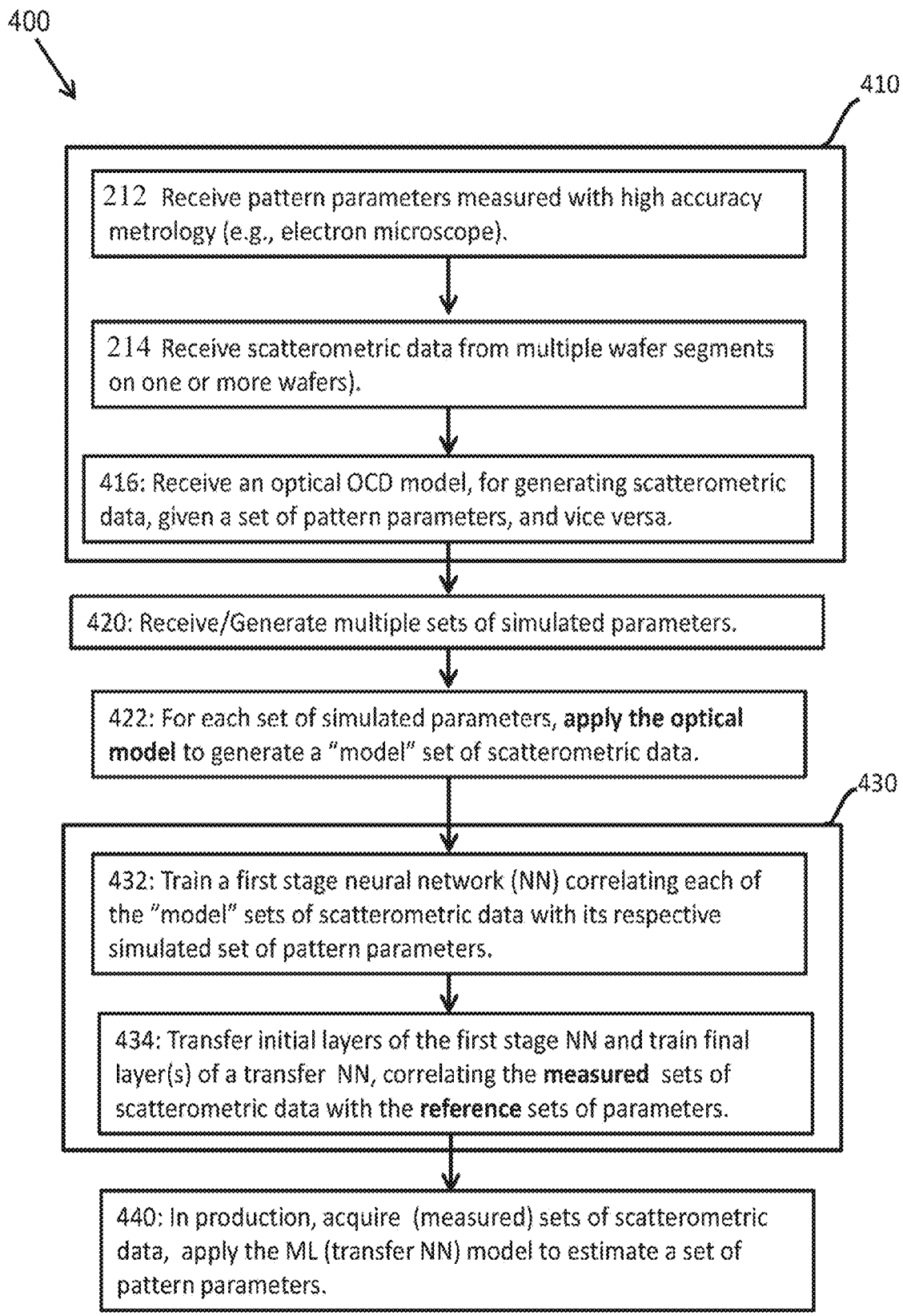
FIG. 4 is a flow diagram depicting a process for generating a second machine learning model for OCD metrology, exploiting both spectrograph data and an optical OCD model, in accordance with an embodiment of the present invention.
Figure 5A:
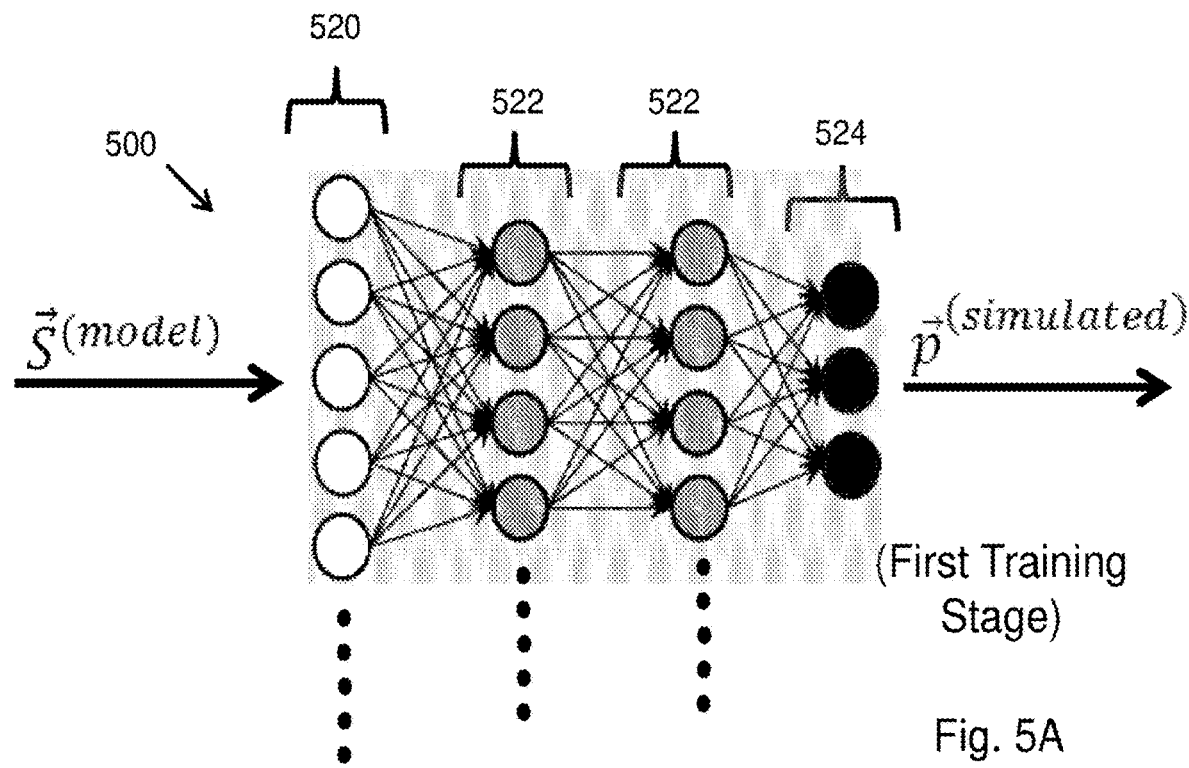
FIG. 5 is a schematic diagrams of a neural network implementing the second machine learning model, in accordance with an embodiment of the present invention.

FIG. 4 is a flow diagram depicting computer-implemented process 400 for generating a machine learning model for OCD metrology, exploiting both spectrograph data and an optical OCD model, in accordance with an embodiment of the present invention. Process 400, like process 200, may be implemented by the ML modeling system 40, described above with respect to FIG. 1. Like process 200, process 400 trains an ML model with both measured and model scatterometric data, the model scatterometric data being generated by an optical model. In contrast with process 200, process 400 includes a two stage ML training process with transfer learning (i.e., step 430, described below).

Process 400 begins with a set of steps 410, at which the modeling system is provided with external data and algorithms. A first step 212 includes receiving multiple sets of reference parameters e.g., parameter vectors $\{\vec{p}_1^{(reference)}, \vec{p}_2^{(reference)}, \ldots, \vec{p}_n^{(reference)}\}$, which are measured from respective reference patterns. A step 214 includes receiving multiple sets of measured scatterometric data, e.g., $\{\vec{S}_1^{(reference)}, \vec{S}_2^{(reference)}, \ldots, \vec{S}_n^{(measured)}\}$, each measured set being measured from a respective reference pattern from which a corresponding set of reference parameters is also measured.

In addition to the sets of measured scatterometric data and the reference parameters, an optical OCD model $f_{OM}$, defined as $\vec{S}^{(model)} = f_{OM}(\vec{p})$, is received at a step 416. Note that the difference between the set of steps 410 and the parallel set of steps 210 of process 200 is that step 416 does not require acquisition of the inverse optical model, in contrast to the parallel step 216, as process 400 does not require this inverse function. It is also noted that the steps of receiving or generating the data required for ML training may be performed in any order. In particular, the optical models may be acquired prior to the other steps, for example, at a step of initializing the ML modeling system.

At a step 420, multiple, simulated, sets of pattern parameters $\vec{p}^{(simulated)}$ are generated, i.e., $\{\vec{p}_1^{(simulated)}, \vec{p}_2^{(simulated)}, \ldots, \vec{p}_n^{(simulated)}\}$. The simulated parameters may be generated to have a distribution reflecting typical manufacturing variations of such parameters.

At a step 422, the optical model $f_{OM}(\vec{p})$ is then applied to each set of simulated pattern parameters $\vec{p}_k^{(simulated)}$ to generate a set of model scatterometric data $\vec{S}_k^{(model)}$. In some embodiments, a set of scatterometric data may be a spectrogram, which may have, for example, 245 data points.

At a step 430, a neural network is trained by transfer learning, including two training stages, a first stage 432 and a transfer stage 434.

At the first stage 432, a first neural network (NN) is trained with a form of fully supervised learning, where each of the generated sets of model scatterometric data $\vec{S}_k^{(model)}$ is applied as an input feature vector to the ML model, with the output feature vector for each input $\vec{S}_k^{(model)}$ being the corresponding set of simulated pattern parameters $\vec{p}_k^{(simulated)}$.

At the second stage of ML training (step 434), the initial layers of the first stage NN (i.e., the activation functions connecting the initial layer nodes) are transferred to the second stage of ML training, which is referred to herein as the "transfer NN" of a "transfer training stage." The transfer NN is then trained with the sets of measured scatterometric data as input features and, for each set of measured scatterometric data, the corresponding set of reference parameters as the output features. After the ML model is trained and validated, it can be used in production, as indicated by a step 440, analogous to the step 240 of process 200.

Figure 5B:
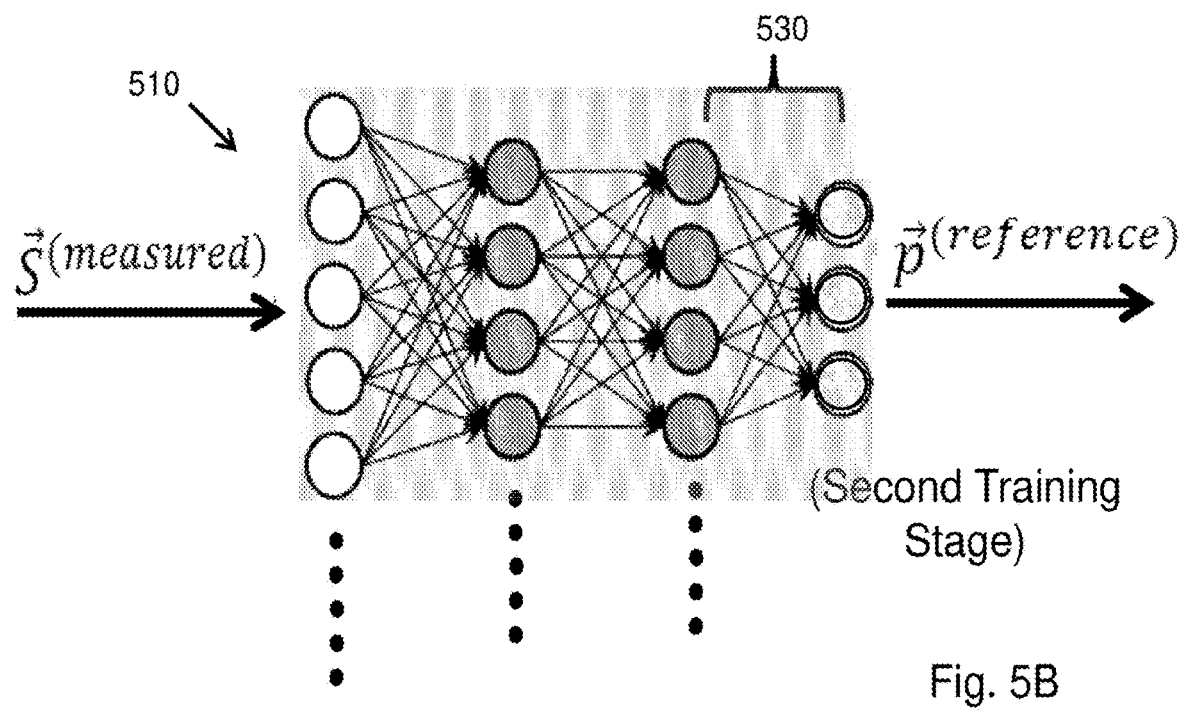

FIGS. 5A and 5B show schematic examples of the two respective stages of ML training described above, a first stage 500 (FIG. 5A), and a transfer training stage 510 (FIG. 5B). In an exemplary embodiment, in the first stage, the input nodes 520, hidden layers 522, and output layer 524 are trained using, for the input features, the vectors $\vec{S}_k^{(model)}$ generated from the simulated parameter vectors $\vec{p}_k^{(simulated)}$, and, for the output ("target") features, the corresponding simulated parameter vectors $\vec{p}_k^{(simulated)}$. That is, training correlates each $\vec{S}_k^{(model)}$ with the respective $\vec{p}_k^{(simulated)}$ from which it was generated.

The transfer training stage applies the same activation functions and hidden nodes calculated in the first training stage, while retraining the final activation layer 530 (shown as white nodes). Training of the transfer NN uses, for input features, the vectors $\vec{S}_k^{(measured)}$, and, for the output features, the corresponding reference parameters $\vec{p}^{(reference)}$, acquired at step 410. That is, training correlates each $\vec{S}_k^{(measured)}$ with the respective $\vec{p}^{(reference)}$ measured from the same pattern.

Typically the number of input nodes corresponds to the size of the vector $\vec{S}^{(measured)}$. Both stages of ML modeling may be configured, in one exemplary implementation, as fully connected neural networks with input layers of size 490. An input layer of 490 nodes could be applied to receive input feature vectors that combine two scatterometric data vectors of 245 data points. The two scatterometric data vectors could be taken from different "channels," i.e., from different measurement configurations for a given pattern. For example, the incident light angle or light polarization could be changed to create two different scatterometric data vectors both providing information with respect to the same pattern. The input layer may be followed by two hidden layers of size 16, the second hidden layer followed by a rectified linear activation function (ReLU) activation function, and a linear output layer of size 3, corresponding to the number of parameters in an exemplary set of pattern parameters.

Figure 6:
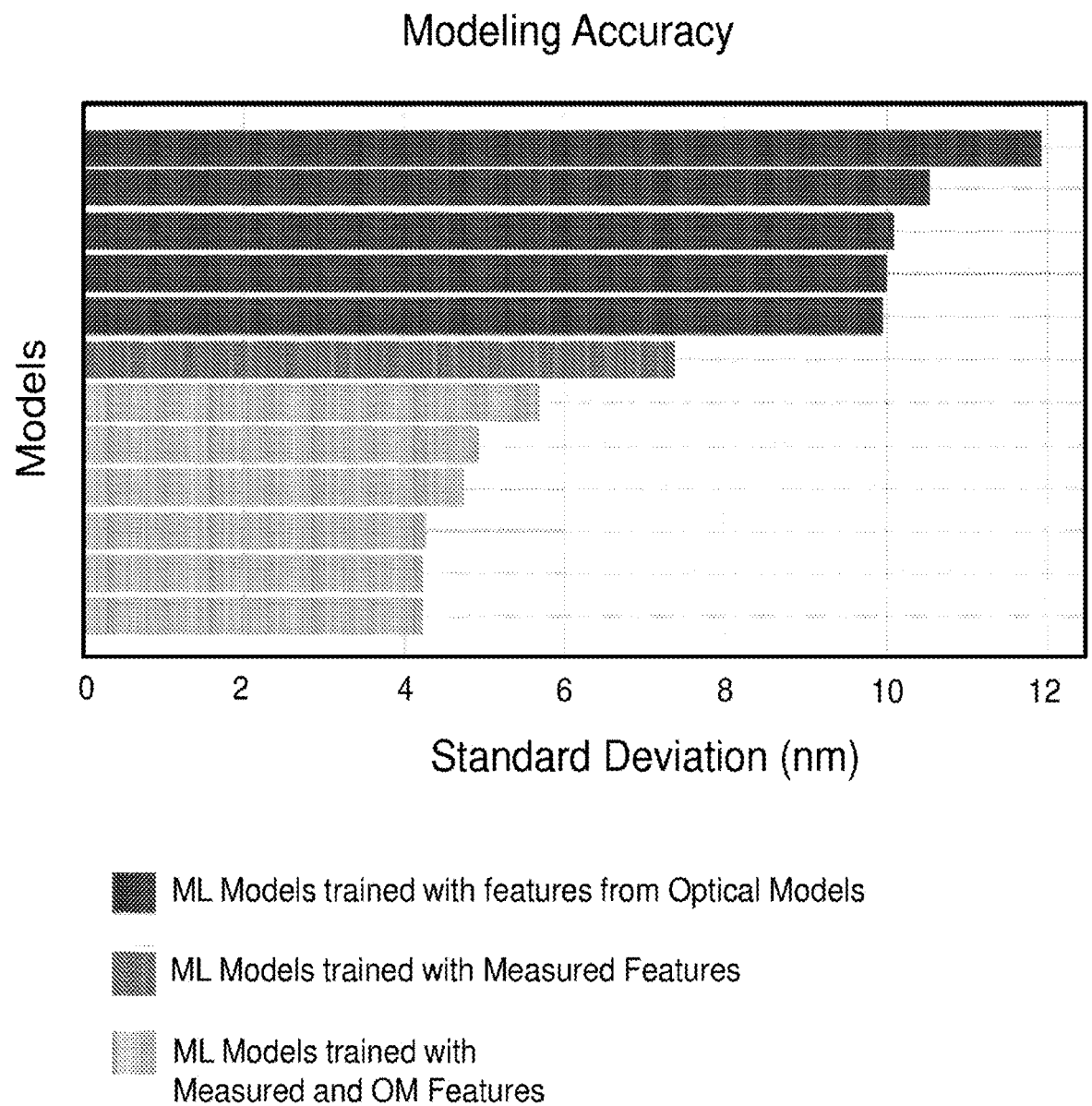
FIGS. 6 and 7 are graphs indicating accuracy of machine learning (ML) models trained with scatterometry data (prior art) as opposed to ML models trained both with measured scatterometry data and with model scatterometry data generated by optical models, in accordance with an embodiment of the present invention.

FIG. 6 is a graph indicating accuracy of ML models trained with both measured scatterometry data and model scatterometry data generated by optical models, according to embodiments of the present invention, as opposed to prior art methods tested by the inventors. Prior art methods include ML models that are trained only with scatterometry data (see for example the abovementioned PCT patent application WO 2019/239380 to Rothstein, et al.), and non-ML methods based only on estimating pattern parameters using optical models (see for example the abovementioned U.S. Pat. No. 6,476,920 to Scheiner and Machavariani). As indicated in the graph of FIG. 6, the standard deviations between reference parameters and parameters predicted by the model were shown to be lower (i.e., the accuracy was better) for ML models developed by the methods described herein. The standard deviation (std) of ML model output $\vec{p}^{(predicted)}$ is typically calculated as follows:

$$std\left(\vec{p}^{(reference)} - \vec{p}^{(predicted)}\right) = \sqrt{\frac{\sum_i \left(\left(\vec{p}_i^{(reference)} - \vec{p}_i^{(predicted)}\right) - \left(\vec{p}_i^{(reference)} - \vec{p}_i^{(predicted)}\right)\right)^2}{n}}$$

Figure 7:
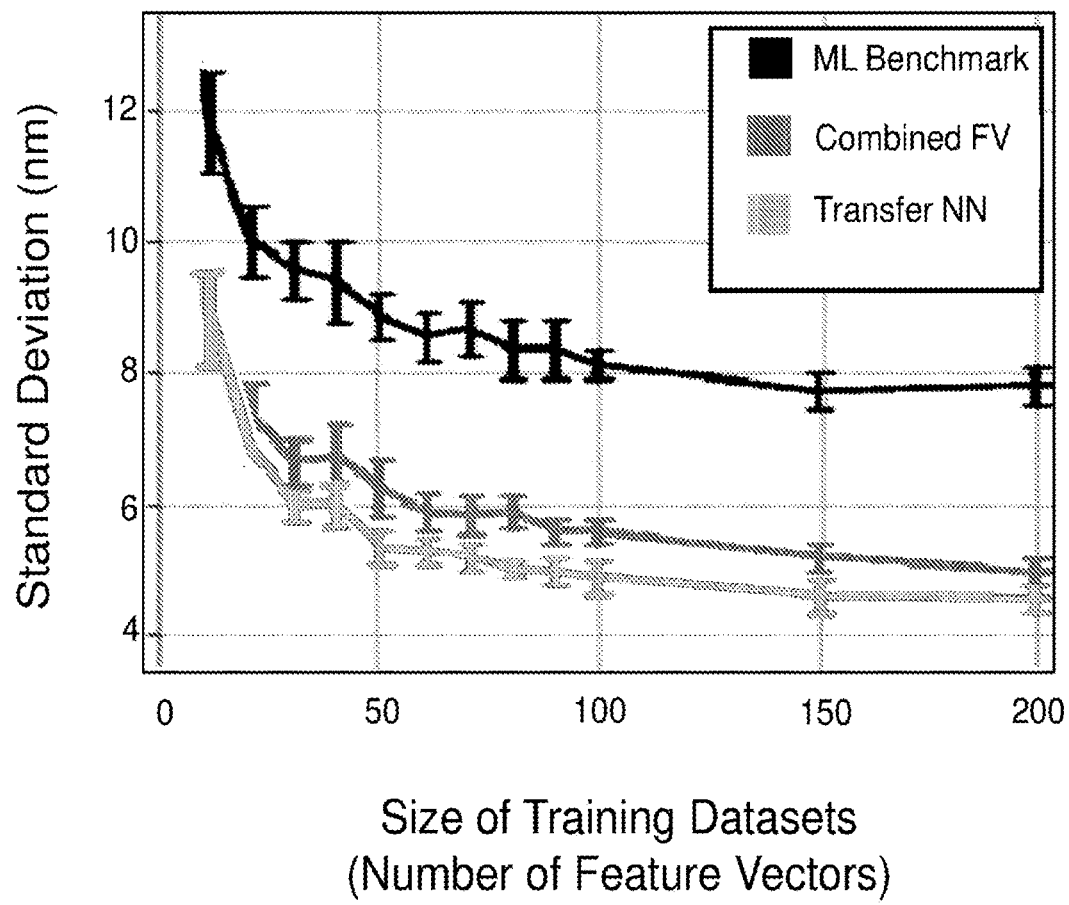

FIG. 7 is a graph indicating accuracy of the processes 200 and 400 disclosed herein, versus prior art ML method described above, indicated as "ML Benchmark". The ML Benchmark was trained with a single training stage, with measured scatterometric data as input features and corresponding reference parameters as output features. Process 200 is indicated as the combined feature vector ("Combined FV") method and process 400 is indicated as the transfer NN method. The training data sets of varying sizes, indicated by error bars marking the graph results, were drawn randomly out of a large pool several times. The error-bars indicated in the graph are 1-sigma uncertainties due to this re-sampling. As indicated the methods of the present invention show significantly better accuracy than the benchmark, for training data sets of greater than 5 or 10 measurements. Dimensionality reduction methods such as kernel principal component analysis (kernel PCA) did not improve the fit compared to the full set of measured data.

As is shown in the graph, process 200 and process 400 both resulted in more accurate ML models than the ML benchmark method.

It is to be understood that processing elements shown or described herein are preferably implemented by one or more computers in computer hardware and/or in computer software embodied in a non-transitory, computer-readable medium in accordance with conventional techniques, such as employing a computer processor, a memory, I/O devices, and a network interface, coupled via a computer bus or alternate connection arrangement. Unless otherwise described, the terms "processor" and "device" are intended to include any processing device, such as, for example, one that includes a CPU (central processing unit) and/or other processing circuitry (e.g., GPUs), and may refer to more than one processing device. Various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette, tapes), flash memory, etc. Such memory may be considered a computer readable storage medium.

In addition, phrases "input/output devices" or "I/O devices" may include one or more input devices (e.g., keyboard, mouse, scanner, HUD, etc.) for entering data to the processing unit, and/or one or more output devices (e.g., speaker, display, printer, HUD, AR, VR, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), Blue-Ray, magnetic tape, Holographic Memory, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Where aspects of the invention are described herein with reference to flowchart illustrations and/or block diagrams of methods, apparatus (systems), and computer program products according to embodiments of the invention, it will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Any flowchart and block diagrams included herein illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order shown herein. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for OCD metrology, comprising:
receiving multiple sets of reference parameters from multiple respective wafer patterns and receiving multiple corresponding sets of measured scatterometric data measured from the multiple respective wafer patterns;
receiving an optical model designed to calculate model scatterometric data from pattern parameters provided to the optical model, wherein the optical model is designed according to physical laws; and wherein the optical model is further designed to perform an inverse function of calculating model pattern parameters from a set of scatterometric data;
calculating multiple sets of model pattern parameters by applying the optical model to calculate for each set of measured scatterometric data a set of corresponding model pattern parameters;
calculating multiple sets of model scatterometric data by applying the optical model to each set of corresponding model pattern parameters, to generate a corresponding set of model scatterometric data;
for each of the multiple sets of measured scatterometric data, generating combined feature vectors by combining the set of measured scatterometric data, the corresponding model pattern parameters, and the corresponding model scatterometric data into a combined feature vector; and
training a machine learning model by applying, during the training, target features including the multiple sets of reference parameters and by applying input features including the combined feature vectors, such that the trained machine learning model estimates new wafer pattern parameters from subsequently measured scatterometric data.

2. The method of claim 1, wherein the training of the machine learning model comprises: training the machine learning model, with the reference parameters as the target features of the training, and the combined feature vectors as the input features.

3. The method of claim 1, wherein the machine learning model is a transfer neural network (NN), wherein the training of the machine learning model comprises training a first NN and the transfer NN, and wherein training the first NN and the transfer NN comprises:
generating multiple sets of simulated pattern parameters reflecting manufacturing variations;
generating multiple sets of model scatterometric data by applying the optical model to generate a set of model scatterometric data for each set of simulated pattern parameters, wherein each set of scatterometric data comprises 245 data points;
training the first NN with a first target set including the multiple sets of simulated pattern parameters and with first input features including the sets of model scatterometric data, wherein the first NN comprises a fully connected neural network with an input layer of 490 nodes, two hidden layers of size 16, a rectified linear activation function (ReLU) after the second hidden layer, and a linear output layer; and
training the transfer NN with initial layers transferred from the first NN, to train one or more final layers of the transfer NN, with the multiple sets of reference parameters as the target features and the multiple sets of measured scatterometric data as the corresponding input features, wherein the transfer NN has the same architecture as the first NN, and wherein the initial layers of the first NN are transferred to the transfer NN and the final layers are trained with the measured scatterometric data.

4. The method of claim 1, wherein training the machine learning model comprises minimizing a loss function with respect to the reference set of pattern parameters, and wherein the loss function is a mean squared error (MSE) function.

5. The method of claim 1, wherein the set of reference parameters are measured with high accuracy metrology by one or more of a CD scanning electron microscope (CD-SEM), an atomic force microscope (AFM), a cross-section tunneling electron microscope (TEM), or an X-ray metrology tool.

6. The method of claim 1, wherein the multiple respective wafer patterns are located on one or more wafers.

7. The method of claim 1, wherein the multiple sets of measured scatterometric data are measured by two or more measurement channels.

8. A system for OCD metrology compromising a processor having non-transient memory, the memory including instructions that when executed by the processor cause the processor to implement steps of:
receiving multiple sets of reference parameters from multiple respective wafer patterns and receiving multiple corresponding sets of measured scatterometric data, measured from the multiple respective wafer patterns;
receiving an optical model designed to calculate sets of model scatterometric data from pattern parameters provided to the optical model, wherein the optical model is designed according to physical laws, and wherein the optical model is further designed to perform an inverse function of calculating model pattern parameters from a set of scatterometric data;
calculating multiple sets of model pattern parameters by applying the optical model to calculate for each set of measured scatterometric data a set of corresponding model pattern parameters;
calculating multiple sets of model scatterometric data by applying the optical model to each set of corresponding model pattern parameters, to generate a corresponding set of model scatterometric data;
for each of the multiple sets of measured scatterometric data, generating combined feature vectors by combining the set of measured scatterometric data, the corresponding model pattern parameters, and the corresponding model scatterometric data into a combined feature vector; and training a machine learning model by applying, during the training, target features including the reference parameters, and by applying input features including the combined feature vectors, such that the trained machine learning model estimates new wafer pattern parameters from subsequently measured sets of scatterometric data.

9. The system of claim 8, wherein the training of the machine learning model comprises: training the machine learning model, with the reference parameters as the target features of the training, and the combined feature vectors as the input features.

10. The system of claim 8, wherein the machine learning model is a transfer neural network (NN), wherein the training of the machine learning model comprises training a first NN and the transfer NN, and wherein training the first NN and the transfer NN comprises:
  generating multiple sets of simulated pattern parameters reflecting manufacturing variations;
  generating multiple sets of model scatterometric data by applying the optical model to generate a set of model scatterometric data for each set of simulated pattern parameters, wherein each set of scatterometric data comprises 245 data points;
  training the first NN with a first target set including the multiple sets of simulated pattern parameters and with first input features including the sets of model scatterometric data, wherein the first NN comprises a fully connected neural network with an input layer of 490 nodes, two hidden layers of size 16, a rectified linear activation function (ReLU) after the second hidden layer, and a linear output layer;
  training the transfer NN with initial layers transferred from the first NN, to train one or more final layers of the transfer NN, with the multiple sets of reference parameters as the target features and the multiple sets of measured scatterometric data as the corresponding input features, wherein the transfer NN has the same architecture as the first NN, and wherein the initial layers of the first NN are transferred to the transfer NN and the final layers are trained with the measured scatterometric data.

11. The system of claim 8, wherein training the machine learning model comprises minimizing a loss function with respect to the reference set of pattern parameters, and wherein the loss function is a mean squared error (MSE) function.

12. The system of claim 8, wherein the set of reference parameters measured with high accuracy metrology is measured by one or more of a CD scanning electron microscope (CD-SEM), an atomic force microscope (AFM), a cross-section tunneling electron microscope (TEM), or an X-ray metrology tool.

13. The system of claim 8, wherein the multiple respective wafer patterns are located on one or more wafers.

14. The system of claim 8, wherein the multiple sets of measured scatterometric data are measured by two or more measurement channels.

* * * * *